United States Patent [19]

Huber

[11] 4,401,447
[45] Aug. 30, 1983

[54] SELF-RETAINING ADSORBENT BAG UNIT

[75] Inventor: Paul W. Huber, Lancaster, N.Y.

[73] Assignee: Multiform Desiccants, Inc., Buffalo, N.Y.

[21] Appl. No.: 172,266

[22] Filed: Jul. 25, 1980

Related U.S. Application Data

[63] Continuation-in-part of Ser. No. 71,768, Aug. 31, 1979, abandoned.

[51] Int. Cl.³ .............................................. B01D 53/04
[52] U.S. Cl. .................................... 55/387; 55/482; 55/490; 55/515; 62/503; 210/282; 210/484
[58] Field of Search .................. 55/274, 275, 387–390, 55/482, 490, 514, 515, 529, 179; 210/238, 282, 323.1, 484; 62/503

[56] References Cited

U.S. PATENT DOCUMENTS

| | | | |
|---|---|---|---|
| 2,210,862 | 8/1940 | Tronstad | 55/274 X |
| 2,589,229 | 3/1952 | Dauphinee | 55/387 X |
| 2,925,171 | 2/1960 | Eaton | 210/282 X |
| 3,734,296 | 5/1973 | Proctor et al. | 210/484 X |
| 3,739,913 | 6/1973 | Bogosian | 210/484 X |
| 3,854,912 | 12/1974 | Terrel et al. | 55/387 X |
| 3,877,909 | 4/1975 | Hansen | 55/514 X |
| 3,951,812 | 4/1976 | Hsu | 210/282 |
| 3,990,872 | 11/1976 | Cullen | 55/389 X |
| 4,111,005 | 9/1978 | Livesay | 62/503 |
| 4,111,813 | 9/1978 | Preus | 210/282 |
| 4,116,649 | 9/1978 | Cullen et al. | 55/387 |
| 4,187,695 | 2/1980 | Schumacher | 62/503 |
| 4,199,960 | 4/1980 | Adams et al. | 62/503 |
| 4,272,264 | 6/1981 | Cullen et al. | 55/387 |
| 4,276,756 | 8/1981 | Livesay | 62/503 |
| 4,291,548 | 9/1981 | Livesay | 55/463 X |

*Primary Examiner*—Robert H. Spitzer
*Attorney, Agent, or Firm*—Joseph P. Gastel

[57] ABSTRACT

An adsorbent unit for installation in a refrigerant receiver including first and second porous container members, adsorbent in the container members, a yoke attaching the first and second containers in end-to-end relationship, an aperture in the yoke for receiving a pipe in the refrigerant receiver, and a length of tubing mounted on the pipe for bearing on the yoke adjacent the aperture to retain the adsorbent unit in position.

36 Claims, 18 Drawing Figures

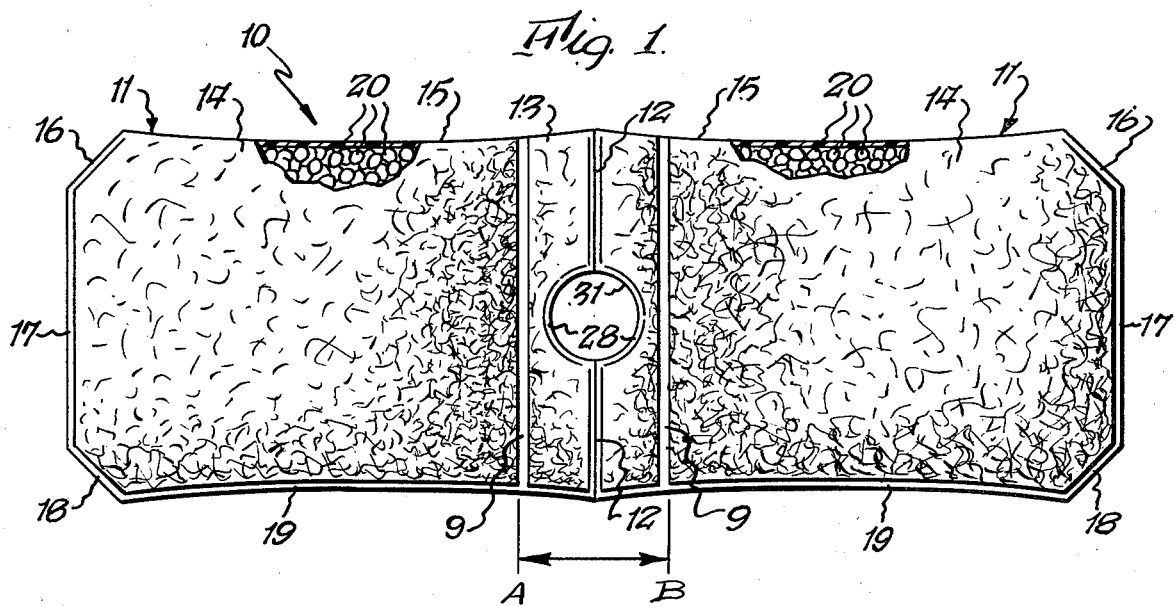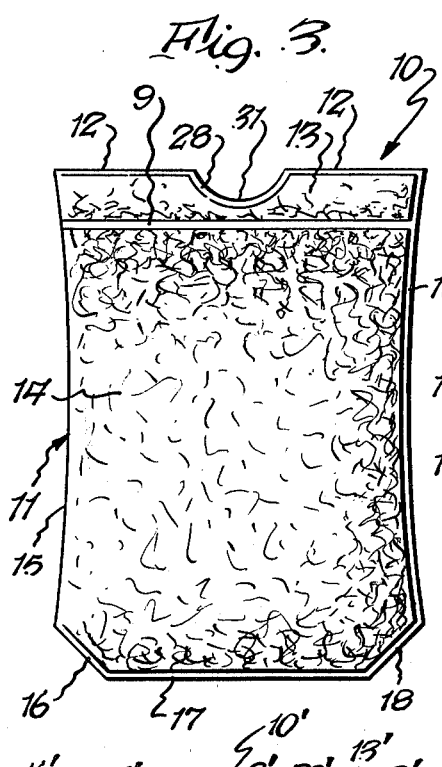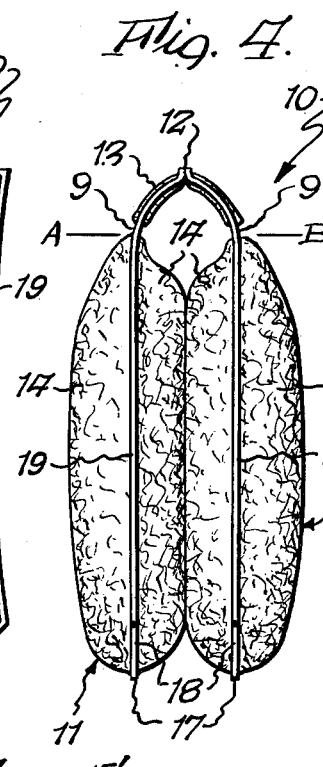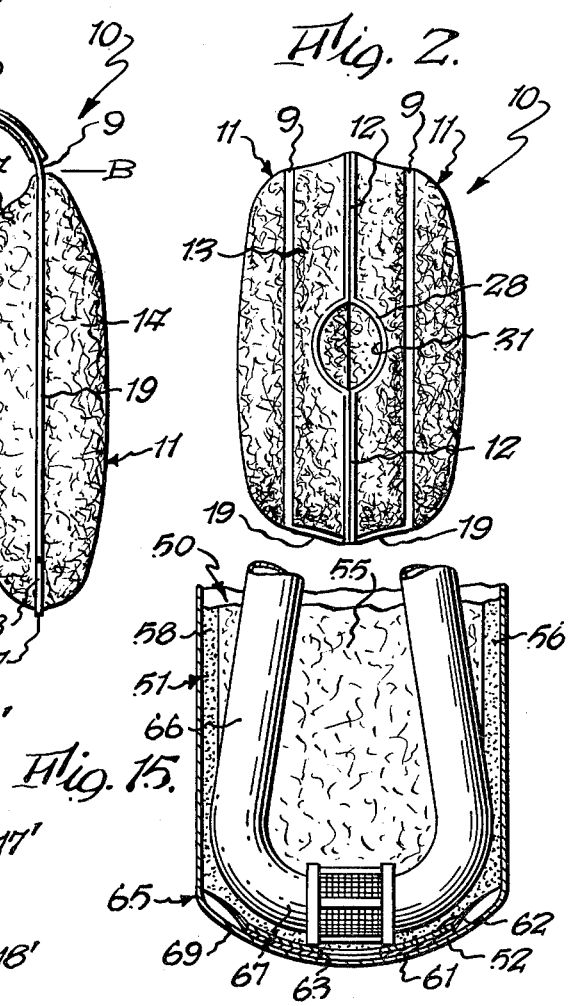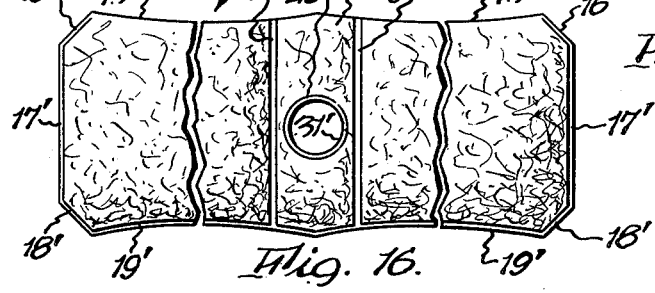

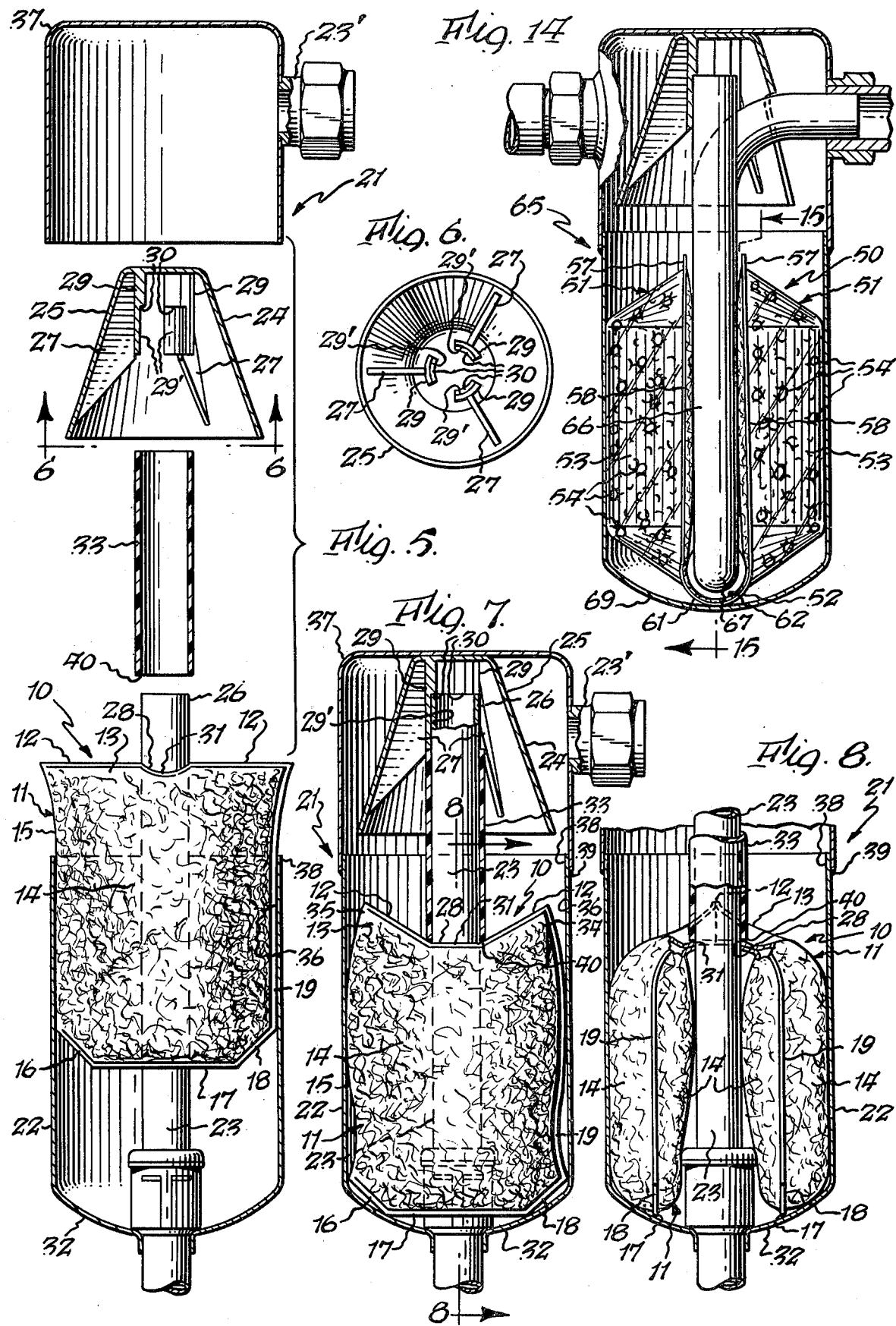

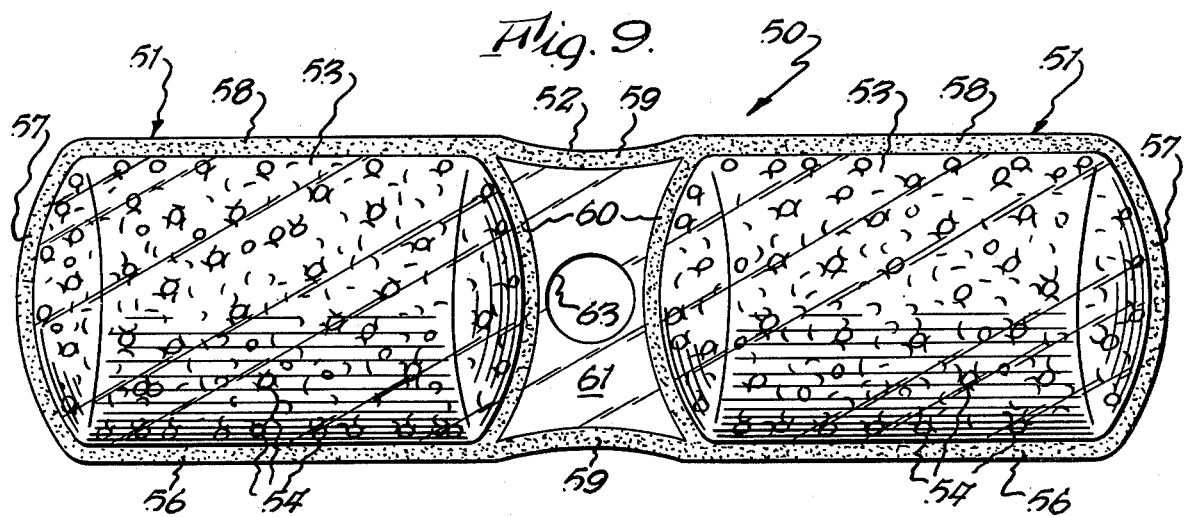
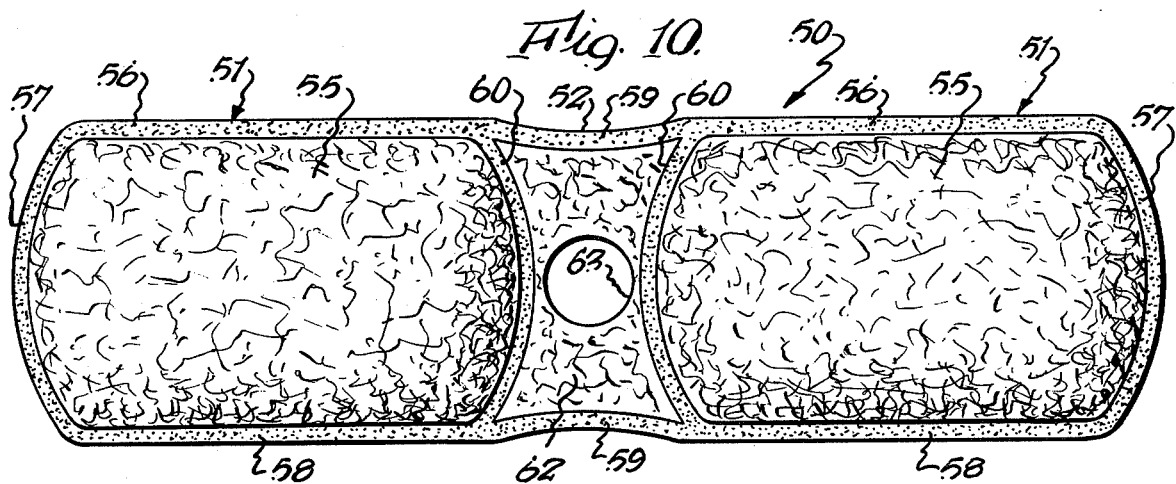
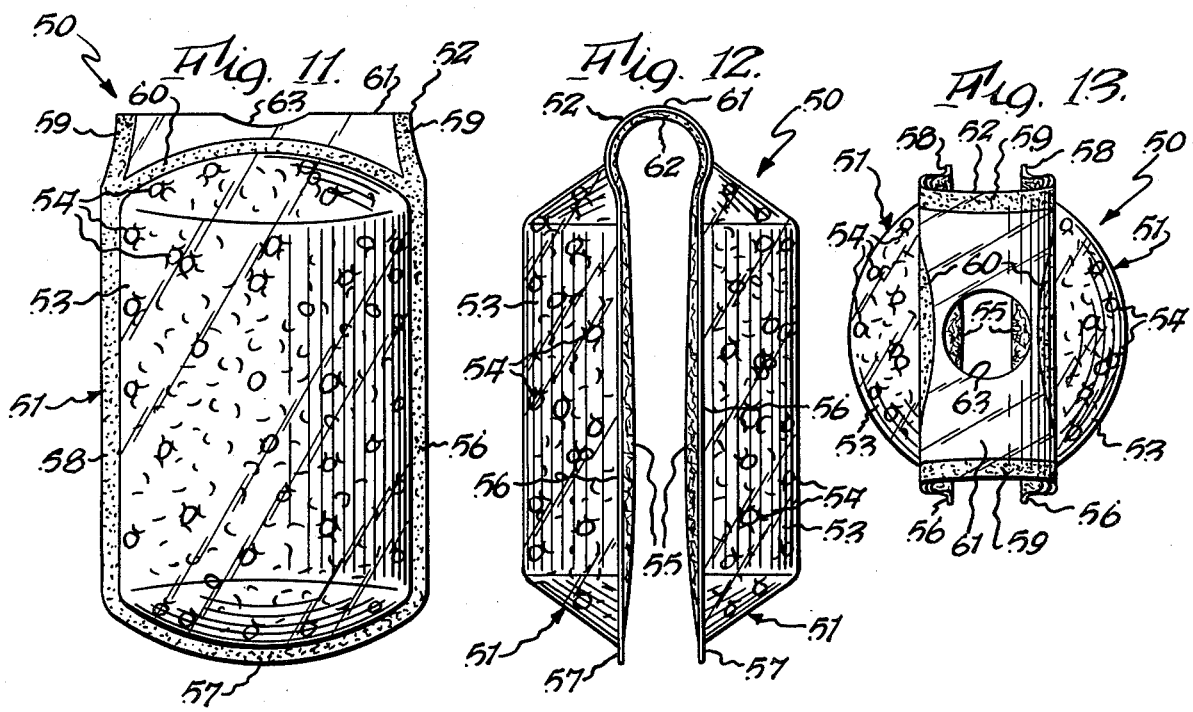

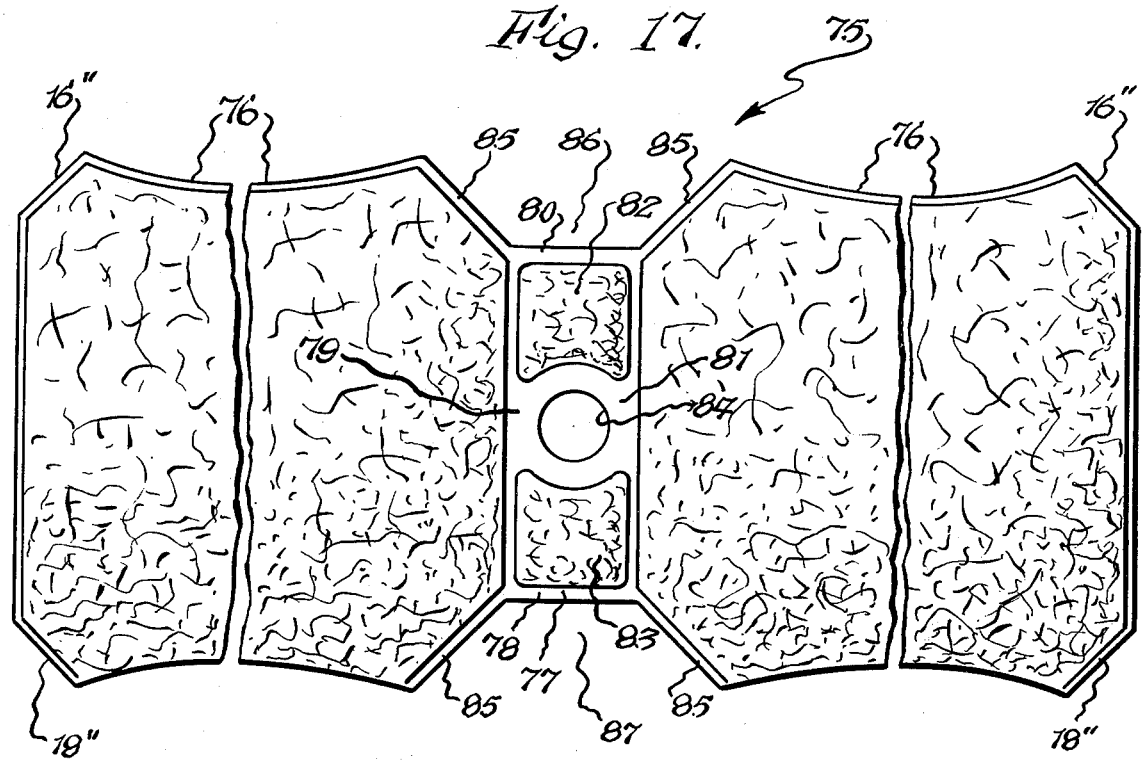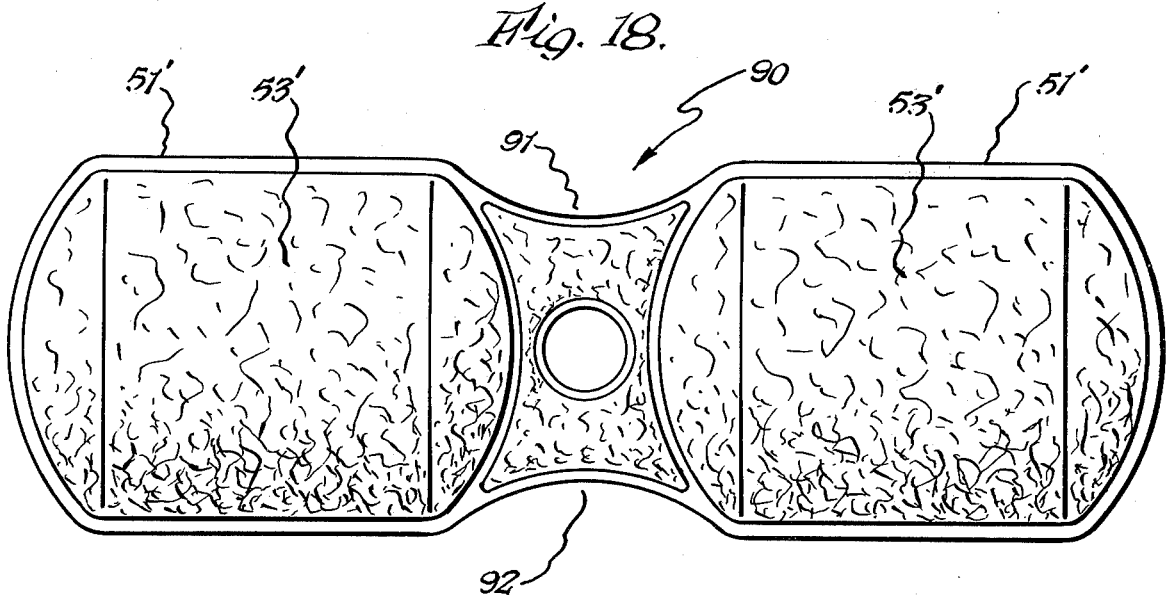

SELF-RETAINING ADSORBENT BAG UNIT

CROSS REFERENCE TO RELATED APPLICATIONS

The present application is a continuation-in-part of application Ser. No. 71,768, filed Aug. 31, 1979, now abandoned.

BACKGROUND OF THE INVENTION

The present invention relates to an improved adsorbent unit which includes a pair of adsorbent containers and a securing yoke joining the containers for holding the unit in position in its operational environment.

It is common practice to place an adsorbent unit in the receiver of a refrigeration system to adsorb undesirable substances from the refrigerant. The adsorbent container should be fixedly positioned within the receiver so that it cannot move about, thereby obviating the possibility of obstructing refrigerant flow or becoming worn and bursting due to abrasive action. In the past, there have been numerous ways of immobilizing the adsorbent container. Such ways are disclosed in U.S. Pat. No. 4,116,649 and in patent application Ser. No. 935,920, filed Aug. 23, 1978, now abandoned.

SUMMARY OF THE INVENTION

It is the object of the present invention to provide an improved adsorbent unit which has a securing member integrally formed therewith and which can be fixedly positioned in its operating environment in an extremely simple and expedient manner.

Another object of the present invention is to provide an improved adsorbent unit containing a securing arrangement which is essentially fabricated incidental to the process of fabricating the adsorbent unit itself.

A further object of the present invention is to provide an improved adsorbent unit which is sufficiently rigid so that it can be fed from automatic machinery to a refrigerant receiver.

A still further object of the present invention is to provide an improved adsorbent unit which will retain a predetermined configuration so that it can be fabricated to provide optimum refrigerant circulation within a receiver. Other objects and attendant advantages of the present invention will readily be perceived hereafter.

The present invention relates to an adsorbent unit comprising first and second porous container members, adsorbent in said container members, and yoke means attaching said first and second container members. In its more specific aspects, there is an aperture in the yoke means to permit it to be mounted on a pipe, and a tube is mounted on the pipe to retain the adsorbent unit in position. The various aspects of the present invention will be more fully understood when the following portions of the specification are read in conjunction with the accompanying drawings wherein:

BRIEF DESCRIPTION OF THE DRAWINGS

FIG. 1 is a plan view of one embodiment of the improved adsorbent unit laid out flat;

FIG. 2 is a plan view of the adsorbent unit of FIG. 1 with the adsorbent container members in side-by-side relationship;

FIG. 3 is a side elevational view of the adsorbent unit with the adsorbent container members in side-by-side relationship;

FIG. 4 is an end elevational view of the adsorbent unit with the adsorbent containers in side-by-side relationship;

FIG. 5 is an exploded view of a refrigerant receiver showing the adsorbent unit being mounted on a centrally located pipe therein;

FIG. 6 is a view taken substantially along line 6—6 of FIG. 5 and showing a deflector which forms a part of the refrigerant receiver in which the adsorbent unit is placed;

FIG. 7 is a cross sectional view of the adsorbent unit in place in an assembled refrigerant receiver;

FIG. 8 is a fragmentary cross sectional view taken substantially along line 8—8 of FIG. 7;

FIG. 9 is a top plan view of a modified form of adsorbent unit;

FIG. 10 is a bottom plan view of the adsorbent unit of FIG. 9;

FIG. 11 is a side elevational view of the adsorbent unit of FIG. 9 with the adsorbent containers lying in side-by-side relationship;

FIG. 12 is an end elevational view of the adsorbent unit of FIG. 11;

FIG. 13 is a plan view of the adsorbent unit of FIG. 12;

FIG. 14 is a cross sectional view of the adsorbent unit of FIGS. 9-13 in place in a different type of refrigerant receiver;

FIG. 15 is a reduced fragmentary cross sectional view taken substantially along line 15—15 of FIG. 14 and showing the contour of the pipe in the refrigerant receiver;

FIG. 16 is a plan view of a modified form of adsorbent unit;

FIG. 17 is a fragmentary plan view of another modified embodiment of the present invention; and FIG. 18 is a plan view of yet another modified embodiment of the present invention.

DESCRIPTION OF THE PREFERRED EMBODIMENTS

One embodiment of the improved adsorbent unit of the present invention is shown in FIGS. 1-8. As noted briefly above, the improved adsorbent unit 10 of the present invention essentially includes a yoke for facilitating the mounting of a pair of adsorbent containers within the accumulator or receiver of a refrigeration system.

Adsorbent unit 10 includes a pair of spaced adsorbent containers 11, which in this instance are bags and which are identical in all respects and are joined to each other in end-to-end relationship by seams 12. In the particular embodiment shown, a yoke is provided between bags 11 and this yoke comprises an extension of the walls 14 of bags 11 which are located above the adsorbent therein. Yoke 13 extends between lines A and B in FIGS. 1 and 4. It will be appreciated that yoke 13 need not be the actual wall portions of the bags 11, but may be a separate member which may be fastened between the bags 11.

Each bag 11 may be identical to the bag shown in U.S. Pat. No. 4,116,649, except that the flap shown in this patent has been omitted. In this respect, adsorbent bag 11 is essentially an elongated pillow-shaped member having enclosed walls 14 of thermoplastic felted fibrous porous sheet material. Each bag 11 is made from a blank of sheet material of appropriate outline, folded upon itself along one longitudinal edge 15. The superimposed edge portions of walls 14 are fused together to form a continuous seam from individual fused seams 16, 17, 18 and 19 to provide two completely enclosed containers, in combination with fused seams 12 and 28. The continuous fused seam of each container is made by applying suitable heat to the edges, considering that each container 11 is fabricated from thermoplastic sheet materials such as felted polypropylene which will melt when heated. By way of example, the walls 14 are between 0.065 and 0.097 inches thick and has a weight of about 9 ounces per square yard. Each bag 11 may be made out of any other suitable fibers which will provide a porous material and which can be joined as by fusion, gluing or in any other suitable manner.

After each bag or container 11 is made by folding the blank to provide edge 15 and forming the seams 16, 17, 18 and 19, the container is filled with adsorbent 20 through the opening which is later closed by seams 9, 12 and 28. Fused seams 9 are provided substantially parallel to seams 12, and seams 9 fuse the opposed walls 14 to each other to confine the adsorbent 20 between each seam 9 and the lower portion of each container 11 bounded by seams 16, 17, 18 and 19. Thus, yoke 13, which extends between seams 9 (or between lines A and B) does not contain any adsorbent 20. Seams 9 in essence constitute a double heat seal safety bar to provide a seal between the adsorbent 20 and yoke 13 to prevent adsorbent 20 from being lost in the event that there should be a rupture of seams 28 or 12. The adsorbent 20 may be of any desirable composition and may selectively include, without limitation, adsorbents such as silica gel, metal, alumino silicate, alumina, calcium sulfate, activated charcoal, molecular sieve, or any other desired compound in bead, pellet or granular form.

At this point it is to be noted that the construction of each bag 11 may be substantially identical, except for seams 9, 12 and 28, to the bag shown and described in copending application Ser. No. 703,979, filed July 9, 1976, now U.S. Pat. No. 4,272,264, which is a continuation of application Ser. No. 495,883, filed Aug. 8, 1974, now abandoned, which is a continuation of Ser. No. 293,677, filed Sept. 29, 1972, now abandoned. At this point it is to be noted that the fibers on walls 14 are tied down to prevent shedding or linting and that all of the fused seams described above completely melt the fibers so that there is no linting from these seams either. All of the foregoing features are fully described in the above-described copending application Ser. No. 703,979, now U.S. Pat. No. 4,272,264.

In FIGS. 5 and 7, a refrigerant receiver or accumulator 21 is shown. Receiver 21 includes a substantially cylindrical cup-shaped receptacle 22 having a concentric inlet conduit 23 leading to the compressor of a refrigerating system. Gaseous liquid refrigerant coming from the evaporator flows from conduit 23' and impinges on the external surface 24 of frustoconical baffle 25 which is mounted on the upper end 26 of pipe 23. In this respect, baffle 25 has a plurality of triangular ribs 27 spaced at 120°. Cylindrical shoe segments 29 are integrally formed at the ends of ribs 27 and they include surfaces 29' which fit on pipe end 26 in complementary mating relationship. Shoulders 30 are formed at the upper ends of shoes 29 and act as a stop for baffle 24 by engaging the top of pipe 23.

In order to assemble adsorbent unit 10 relative to receiver 21, all that is necessary is to insert the upper end 26 of pipe 23 through aperture 31 and move unit 10 downwardly until it assumes the position shown in FIG. 7 wherein seams 17 essentially rest against the dished bottom portion 32 of receiver portion 22. A plastic tube 33 is then slid over pipe 26 to the position shown in FIG. 7, and thereafter baffle 24 is mounted on the pipe end 26. It can be seen from FIG. 7 that the length of tube 33 is such that it will bear down on the edges of seams 12 on opposite sides of aperture 31 and cause the unit 10 to assume the configuration shown in FIG. 7 wherein the upper portions 34 and 35 of yoke 13 are deflected away from the internal surface 36 of receiver portion 22. This is of importance in view of the fact that receiver cap 37 is telescopically mounted on the upper edge portion 38 of receiver portion 22 and joined thereto by welding at 39. Because yoke portions 34 and 35 are deflected away from engagement with the inside surface 36, the welding heat cannot melt the portion of the adsorbent unit which is close to the weld. The reason that portions 34 and 35 of the yoke assume the position shown in FIG. 7 is due in part to the fact that seams 12 are relatively rigid as compared to the flexibility of the remainder of the yoke 13. However, these portions will also deflect away even if seams 12 have been omitted, as in the embodiment of FIG. 16 to be described hereafter. As noted above, aperture 31 is bounded by a rigid fused seam 28 which is of the proper size for good sliding engagement with pipe 23. The lower end 40 of tube 33 bears on the yoke proximate seam 28. Tube 33 firmly holds adsorbent unit 10 in position because it wedges the unit between the lower end 40 of the tube and cupped portion 32 of the receiver.

In FIGS. 9–13 another embodiment of the present invention is disclosed, namely, adsorbent unit 50 which includes two adsorbent containers 51 which are attached to each other by yoke 52. Each container 51 includes a vacuum formed plastic pocket member 53 fabricated from a suitable material such as polypropylene. However, it is preferred that pocket members 53 be fabricated from other thermoplastic polymers which have a relatively high temperature tolerance, such as polyester, so that the adsorbent unit 50 can be reactivated by heat without adversely affecting members 53. After pocket members 53 are filled with a suitable adsorbent 54, of the types enumerated above, a sheet of felted thermoplastic porous material 55, of the type described above relative to FIGS. 1–8, is placed over the open sides of pocket members 51 and over yoke portion 61 of yoke 52 and heat-sealing is effected along edge portions 56, 57, 58, 59 and 60 of pocket members 53. The felted porous thermoplastic material will fuse to the rigid thermoplastic material. It will be appreciated that any compatible felted porous material and rigid material can be used for opposite sides of the container. Yoke 52 includes an outer portion 61 which is the same material as pocket members 53, and yoke portion 61 is a continuation of and an integral portion of pockets 53. In other words, pockets 53 and yoke portion 61 are fabricated as an integral unit. Adjacent yoke portion 61 is a porous thermoplastic felted sheet material portion 62 (FIG. 10) which is a continuation of portions 55. An aperture 63 is formed in yoke 52 for receiving a pipe, such as 23 as described above relative to FIGS. 5 and 7.

The use of the vacuum formed container portions 53 provides rigidity to the adsorbent unit 50. This material has good qualities in compression and in tension. The felted material 62, which forms the underside of yoke 52, has good resistance against fracture and tear. Therefore, yoke 52 has all of the desirable qualities noted above. The advantage of a rigid adsorbent unit 50 is that it lends itself to feeding from automatic machinery and in addition the rigid shape can be designed to provide optimum circulation through the container in which it is placed. Pocket members 53 are not porous, only the felted material 55 is. Therefore adsorbent unit 50 can be exposed to air longer than the embodiment of FIGS. 1-8 without the consequences of adsorbing too much moisture from the air.

In FIGS. 14 and 15 a receiver or accumulator unit 65 is shown with adsorbent unit 50 positioned in a different manner. Pipe 66 of receiver 65 is U-shaped as shown and therefore the bottom portion 67 of the U bears on yoke 52 to hold it against dished receiver portion 69. In this way adsorbent unit 50 is anchored within receiver 65. It will be appreciated that adsorbent unit 10 can also be placed in receiver 65 in the same manner.

In FIG. 16 a still further embodiment of the present invention is disclosed. Yoke 13' between seams 9' is one continuous piece of material so that the adsorbent unit 10' may be fabricated from a single piece of porous material which has been folded over on itself, thereby obviating the necessity to join two separate containers 11 along seams 12, as in FIG. 1. In other words, adsorbent unit 10' of FIG. 16 is identical in all respects to the adsorbent unit of FIG. 1 except for seams 12, and parts of unit 10' corresponding to parts of unit 10 of FIG. 1 have been designated by corresponding numerals which have been primed.

In FIG. 17 a further modified adsorbent unit 75 is disclosed, which may be identical in all respects to the embodiment described in FIG. 16 except for certain differences described hereafter. Adsorbent unit 75 consists of two bags or containers 76 fabricated of felted material on all sides from a single piece of felted fibrous plastic material as described above relative to FIG. 16. The yoke 77 is formed by applying heat along the areas designated 78, 79, 80 and 81, that is, those areas which do not have the shading denoting fibrous material, namely, areas 82 and 83. Areas 78, 79, 80 and 81 are where two layers of fibrous material are fused. An aperture 84, which is analogous to aperture 31', is provided in yoke 77. The main difference between the embodiments of FIGS. 1 and 16, on one hand, and FIG. 17, on the other hand, is in the chamfered corner edges 85 of each bag 76. It can readily be seen that when the adsorbent unit 75 is folded over on itself, as shown in FIGS. 2-4, and inserted into a refrigerant receiver, such as 65 (FIG. 15), with the yoke 77 located at the bottom of the receiver, edges 85 will provide a camming action to facilitate entry of the container 75 into the receiver. In this respect, it can be seen from FIGS. 5 and 7 that edges 85 will provide the same function as edges 16 and 18 of container 10 so as to facilitate the entry of the container into the refrigerant receiver. In addition, the cutaways 86 and 87 defined by edges 85-80-85 and 85-78-85, respectively, will tend to prevent obscuring of an oil bleed hole at the lowermost portion of conduit 66 in FIG. 15. At this point it will be noted that the outer ends of containers 76 are chamfered, or trimmed diagonally, at 16" and 18" in the same manner as edges 16 and 18 of FIG. 1 and 16' and 18' of FIG. 16. This construction facilitates the camming of the container 75 into a refrigerant receiver, as can be visualized from FIG. 5, when the container 75 is inserted in an upright position.

In FIG. 18 a further modified adsorbent unit 90 is disclosed which may be identical in all respects to the embodiment disclosed in FIGS. 9-14, except for the following differences. First of all, the plastic pocket members 53', which are analogous to pocket members 53 of FIGS. 9-13, are formed from porous thermoplastic felted fibrous sheet material of the same type used for sides 55 of the embodiment of FIGS. 9-13. Thus, since all sides of each container 51', which is analogous to container 51, are porous, there is greater surface area for passage of liquid into the container than in the embodiment of FIGS. 9-13. This is achieved while retaining the configuration of the embodiment of FIGS. 9-13. In addition, the cutaway portions at 91 and 92 are more severe than shown for the embodiment in FIG. 10 to thereby provide improved camming action when the adsorbent unit 90 is installed in an inverted position, as shown in FIG. 14, and to also prevent obscuring of the oil bleed hole at the bottom of conduit 66, as discussed above relative to FIG. 17.

While preferred embodiments of the present invention have been disclosed, it will be appreciated that the present invention is not limited thereto but may be otherwise embodied within the scope of the following claims.

What is claimed is:

1. An adsorbent unit comprising first and second porous fabric container members having first and second porous fabric walls, respectively, first and second container edge portions on said first and second container members, respectively, first and second central container portions on said first and second container members, respectively, within the confines of said first and second container edge portions, respectively, adsorbent in said first and second container members, and elongated planar sheet-like yoke means for coupling said first and second container members relative to each other in spaced relationship for mounting said adsorbent unit relative to an external structural member, said elongated planar sheet-like yoke means having a central yoke portion and first and second spaced yoke portions on opposite sides of said central yoke portion, first and second opposite yoke edge portions on said yoke means, third and fourth opposite yoke edge portions on said yoke means, said central yoke portion and said first and second spaced yoke portions lying between said first and second opposite yoke edge portions of said yoke means and between said third and fourth opposite yoke edge portions of said yoke means, said first, second, third and fourth opposite yoke edge portions defining the yoke length and the yoke width dimensions of said yoke means, said first and second opposite yoke edge portions being connected to said first and second container members, respectively, with said defined yoke length and yoke width dimensions of said yoke means defining a connecting portion of said yoke means which extends between said first and second container members to couple portions of said first and second container edge portions proximate said yoke means in spaced relationship, said elongated planar sheet-like yoke means extending between said container members with said first and second spaced yoke portions extending in a direction away from said first and second yoke edge portions, respectively, and extending in a direction away from said first and second central container portions, respectively.

2. An adsorbent unit as set forth in claim 1 wherein said first and second yoke edge portions are connected to said first and second container members, respectively, proximate portions of said first and second container edge portions, respectively.

3. An adsorbent unit as set forth in claim 2 including seam means for defining a seal between said adsorbent in said container members and said yoke means.

4. An adsorbent unit as set forth in claim 2 wherein said wall portions comprise fusible plastic material, and a fused seam coupling the wall portions of each of said containers to each other.

5. An adsorbent unit as set forth in claim 1 wherein said yoke means and said first and second walls are integral.

6. An adsorbent unit as set forth in claim 1 wherein said porous container members each comprise a first wall of rigid plastic and a second wall of flexible plastic, and seam means attaching said first and second walls to confine said adsorbent therebetween.

7. An adsorbent unit as set forth in claim 6 wherein said yoke means is a continuation of said flexible plastic second wall.

8. An adsorbent unit as set forth in claim 7 including an aperture in said yoke means.

9. An adsorbent unit as set forth in claim 6 wherein said yoke means is a continuation of said rigid plastic first wall.

10. An adsorbent unit as set forth in claim 9 wherein said yoke means is a continuation of said flexible plastic second wall.

11. An adsorbent unit as set forth in claim 10 including an aperture extending through said yoke means.

12. An adsorbent unit as set forth in claim 6 wherein said first wall is formed into a concave shape and wherein said second wall is substantially planar.

13. An adsorbent unit as set forth in claim 12 wherein said first and second walls are fabricated from porous material.

14. An adsorbent unit as set forth in claim 13 including an aperture extending through said yoke means.

15. An adsorbent unit as set forth in claim 6 including concave ends on said yoke means, said concave ends extending in a substantially lengthwise direction between said container members.

16. An adsorbent unit as set forth in claim 6 wherein both said first and second walls are porous.

17. An adsorbent unit as set forth in claim 1 wherein each of said container members includes a first end portion proximate said yoke means and a second end portion remote from said yoke means, and chamfers on the outer ends of each of said first end portions lying outwardly of said yoke means.

18. An adsorbent unit as set forth in claim 1 wherein each of said container members includes a first end portion proximate said yoke means and a second end portion remote from said yoke means, and chamfers on the outer ends of each of said second end portions.

19. An adsorbent unit as set forth in claim 18 including chamfers on the outer ends of each of said first end portions.

20. An adsorbent unit as set forth in claim 1 wherein said porous container members each comprise a first rigid wall and a second flexible wall, and seam means attaching said first and second walls to confine said adsorbent therebetween.

21. An adsorbent unit as set forth in claim 20 wherein said first and second walls are fabricated or porous thermoplastic felted fibrous sheet material.

22. An adsorbent unit as set forth in claim 1 including an aperture in said central yoke portion, said aperture including a portion spaced substantially equidistantly from said portions of said first and second container edge portions.

23. An adsorbent unit as set forth in claim 22 wherein said container members include flexible wall portions, and wherein said yoke means comprises an extension of said flexible wall portions.

24. An adsorbent unit as set forth in claim 23 including seam means for defining a seal between said adsorbent in said container members and said yoke means.

25. An adsorbent unit as set forth in claim 1 wherein said yoke means comprises flexible fabric material.

26. An adsorbent assembly for a container having a substantially central pipe extending axially thereof comprising first and second porous container members, adsorbent in said container members, yoke means for securing said first and second container members to each other, said yoke means including a central portion and outer end portions, an aperture in said central portion of said yoke means for receiving said pipe to thereby cause said first and second container members to lie on opposite sides of said pipe, and hold-down means for mounting on said pipe for pressing on said central portion of said yoke means to retain said container members in position in said container.

27. An adsorbent assembly as set forth in claim 26 wherein said hold-down means comprises a tubular member for fitting on the outside of said pipe.

28. An adsorbent assembly as set forth in claim 27 wherein said first and second container members lie in side-by-side relationship on opposite sides of said pipe, and wherein the force exerted by said tubular member on said central portion of said yoke means causes said outer end portions of said yoke means to be deflected away from said container.

29. An adsorbent unit as set forth in claim 26 wherein said container members each include first and second walls, each of said first walls comprising a rigid member having a concave inner surface and a convex outer surface, and each of said second walls comprising a substantially planar member, and wherein said container includes a concave wall portion, and wherein said second walls lie in contiguous relationship to said pipe, and wherein said convex outer surfaces of said first wall lie adjacent said concave wall portion of said container.

30. An adsorbent unit as set forth in claim 29 wherein said first and second walls are fabricated of porous thermoplastic felted fibrous sheet material.

31. In a refrigerant receiver having a bottom wall and a side wall and having a U-shaped portion of pipe extending axially of said receiver with a portion of said U-shaped portion of pipe in contiguous relationship to said bottom wall of said receiver, the improvement comprising an adsorbent unit including first and second porous fabric container members having first and second porous fabric walls, respectively, first and second container edge portions on said first and second container members, respectively, first and second central container portions on said first and second container members, respectively, adsorbent in said container members, and yoke means for securing said first and second container members to each other, said yoke means being positioned between said bottom wall of said receiver and said U-shaped portion of said pipe in contiguous relationship to said bottom wall of the receiver to thereby hold said adsorbent unit in position within said container with said container members lying between opposite sides of said U-shaped portion of pipe and said side wall of said receiver, said yoke means having a central yoke portion and first and second spaced yoke portions on opposite sides of said central yoke portion, first and second opposite yoke edge portions on said yoke means, third and fourth opposite yoke edge portions on said yoke means, said central yoke portion and said first and second spaced yoke portions lying between said first and second opposite yoke edge portions of said yoke means and between said third and fourth opposite edge portions of said yoke means, said first, second, third and fourth opposite yoke edge portions defining the length and width dimensions of said yoke means, said first and second opposite yoke edge portions being connected to said first and second container members, respectively, with said defined yoke length and yoke width dimensions of said yoke means defining a connecting portion of said yoke means which extends between said first and second container members to couple portions of said first and second container edge portions proximate said yoke means in spaced relationship, said yoke means extending between said container members with said first and second spaced yoke portions extending in a direction away from said first and second yoke edge portions, respectively, and extending in a direction away from said first and second central container portions, respectively.

32. In a refrigerant receiver as set forth in claim 31 wherein one of said first walls and one of said second walls comprise a wall having a concave inner surface and a convex outer surface, and wherein one of said first walls and one of said second walls are substantially planar walls, and wherein said side wall of said receiver is concave, and wherein said planar first and second walls lie in contiguous relationship to said U-shaped portion of said pipe, and wherein said convex outer surfaces of said first and second walls lie adjacent said concave wall of said receiver.

33. An adsorbent unit as set forth in claim 32 wherein said first and second walls are fabricated of porous thermoplastic felted fibrous sheet material.

34. An adsorbent unit as set forth in claim 31 including aperture means in said yoke means located between said U-shaped portion of said pipe and said bottom of said container.

35. An adsorbent unit as set forth in claim 34 wherein said aperture means comprises a large aperture located directly under said U-shaped portion of said pipe.

36. An adsorbent unit comprising first and second porous fabric container members having first and second porous fabric walls, respectively, first and second container edge portions on said first and second container members, respectively, adsorbent in said container members, and elongated planar sheet-like yoke means for coupling said first and second container members relative to each other in spaced relationship for mounting said adsorbent unit relative to an external structural member, said elongated planar sheet-like yoke means having a central yoke portion and first and second spaced yoke portions on opposite sides of said central yoke portion, first and second opposite yoke edge portions on said yoke means, third and fourth opposite yoke edge portions on said yoke means, said central yoke portion and said first and second spaced yoke portions lying between said first and second opposite yoke edge portions of said yoke means and between said third and fourth opposite yoke edge portions of said yoke means, said first, second, third and fourth opposite yoke edge portions defining the yoke length and the yoke width dimensions of said yoke means, said first and second opposite yoke edge portions being connected to said first and second container members, respectively, with said defined yoke length and yoke width dimensions of said yoke means defining a connecting portion of said yoke means which extends between said first and second container members to couple portions of said first and second container edge portions proximate said yoke means in spaced relationship, said elongated planar sheet-like yoke means extending between said container members with said first and second spaced yoke portions extending in a direction away from said first and second yoke edge portions, respectively, and extending in a direction away from said first and second central container portions. respectively, said yoke means also including a yoke thickness dimension, and said container members including container length, container width and container thickness dimensions, and said yoke means being fabricated from flexible material which permits said container members and said yoke means to be oriented with their respective thickness dimensions extending in substantially the same directions when said container members are oriented in end-to-end relationship with their length dimensions extending in substantially the same direction and their width dimensions extending substantially parallel to each other, and which permits said yoke thickness dimension and said container thickness dimensions to have portions extending substantially perpendicularly to each other when said container members are oriented with their length dimensions extending substantially parallel to each other and said container width dimensions extending substantially parallel to each other.

* * * * *

UNITED STATES PATENT AND TRADEMARK OFFICE
CERTIFICATE OF CORRECTION

PATENT NO. : 4,401,447
DATED : August 30, 1983
INVENTOR(S) : Paul W. Huber

It is certified that error appears in the above-identified patent and that said Letters Patent are hereby corrected as shown below:

Column 7, line 65 (claim 21), change "or" to read --of--.

Signed and Sealed this

Twenty-fifth Day of October 1983

[SEAL]

Attest:

GERALD J. MOSSINGHOFF

Attesting Officer    Commissioner of Patents and Trademarks